March 9, 1954  R. SAULNIER  2,671,622
EMERGENCY PILOT EJECTOR
Filed Dec. 5, 1951  14 Sheets-Sheet 1

March 9, 1954  R. SAULNIER  2,671,622
EMERGENCY PILOT EJECTOR
Filed Dec. 5, 1951  14 Sheets-Sheet 2

Fig.9

March 9, 1954 R. SAULNIER 2,671,622
EMERGENCY PILOT EJECTOR
Filed Dec. 5, 1951 14 Sheets-Sheet 5

Fig. 10a

INVENTOR
Raymond Saulnier
BY Brown + Seward
ATTORNEYS

March 9, 1954

R. SAULNIER 2,671,622

EMERGENCY PILOT EJECTOR

Filed Dec. 5, 1951

INVENTOR
Raymond Saulnier
BY Brown + Deward
ATTORNEYS

March 9, 1954 R. SAULNIER 2,671,622
EMERGENCY PILOT EJECTOR
Filed Dec. 5, 1951 14 Sheets-Sheet 7

Fig.12

INVENTOR
Raymond Saulnier
BY Brown + Seward
ATTORNEYS

R. SAULNIER 2,671,622

EMERGENCY PILOT EJECTOR

Filed Dec. 5, 1951

INVENTOR
Raymond Saulnier
BY Brown & Deward
ATTORNEYS

Patented Mar. 9, 1954

2,671,622

UNITED STATES PATENT OFFICE 2,671,622

EMERGENCY PILOT EJECTOR

Raymond Saulnier, Paris, France

Application December 5, 1951, Serial No. 260,066

Claims priority, application France
December 16, 1950

12 Claims. (Cl. 244—141)

This invention relates to devices for evacuating, in case of emergency, a pilot and/or other occupants from a flying plane, even at a high speed.

None of the existing evacuation devices is sufficiently safe.

Those in which the pilot is ejected upwards together with his seat, under the action of an explosive cartridge, may be sufficient when the speed of the plane is not too considerable, but they are objectionable and dangerous with the high speeds of the modern craft. As a matter of fact, at such speeds, to save the pilot from being crushed against the tail surfaces, it is necessary to impart him with such a high acceleration that it may endanger his life. Moreover, the ejectable seat is heavy and cumbersome, so that it requires an often objectionable increase of the height of the cockpit.

Now, the devices in which the pilot is evacuated downwards are of two main types.

In the first one, the pilot has to leave his seat to reach the upper opening of a chute through which he can dive. This is obviously only possible when sufficient time and strength is left to the pilot. Moreover, most of these devices require a considerable space in or under the cockpit.

Another type of downwards evacuating devices is that in which the seat of the pilot is tiltable forwards or backwards into a position from which the person occupying the seat is evacuated.

All known evacuating devices of the tiltable seat type, however, have the drawback that the pilot leaves the plane in an uncontrolled position, along an uncontrolled direction and with no initial translation speed, so that he risks to be projected by the wind against the plane or, in the case of forwards evacuation, to remain stuck on his seat by air resistance. Moreover, the path of the pilot, after he has left the plane, remains undetermined and, thence, unsafe.

An object of the invention is to provide a device for ejecting, through the bottom of the fuselage of a flying plane, a pilot and/or other occupants of said plane along a predetermined direction, with an initial translation speed sufficiently high to avoid any risk of collision with the plane, while requiring but a non-dangerous acceleration, however high the speed of the plane, and in such a position as to make the subsequent parachute descent as safe as possible, the triggering of said device being effected by the pilot from his seat and with only a negligible stress, said device implying no increase of the cockpit and fuselage dimensions and the ejection affecting no important part of the plane.

The ejector according to the invention is essentially constituted by a seat adapted to be tilted, upon actuation of simple control means, from a normal seating position to a position in which the back of said seat makes an acute angle with the longitudinal axis of the plane, the head of the occupant being directed towards the rear of the plane, and from which the person occupying said seat can be ejected through a passage then leading outwards through the bottom of the fuselage, along a well defined direction, in a predetermined position and with a sufficient initial translation speed.

When the speed of the plane is exceedingly high and/or when the attitude of the plane is too different from the normal, the action of gravity may be unsufficient to tilt the seat and to impart the pilot, before he leaves the plane, with the required initial speed.

Another object of the invention is to provide an ejector of the type described, further comprising positive tilting means capable of aiding or, even, of replacing the tilting action of gravity.

A further object of the invention is to provide an ejector of the type described, further comprising means to impart the pilot or other occupant to be evacuated, whichever may be the flying speed and/or the attitude of the plane, with an acceleration which, while not being dangerously high, is however such that the pilot leaves the plane without any risk of collision therewith.

Other objects and advantages of the invention will be apparent from the following detailed description, together with the accompanying drawings, submitted for purposes of illustration only and not intended to define the scope of the invention, reference being had for that purpose to the subjoined claims.

In these drawings:

Fig. 7 is a diagrammatic elevational view and Fig. 8 a plane view showing the relative positions of the pilot during its evacuation with respect to the two jets of a plane.

Referring first to Figs. 1 to 6, there is shown at 1 a seat articulated forwards about an axis 21 and suspended backwards in its normal position on detachable suspending means constituted, in the example shown, by an electric jack 6—14. The seat 1 proper is carried by two arms 4 on which it is, in turn, articulated so as to be tiltable about another axis 2.

Figures 1, 2, 3, 4, 5, 6:
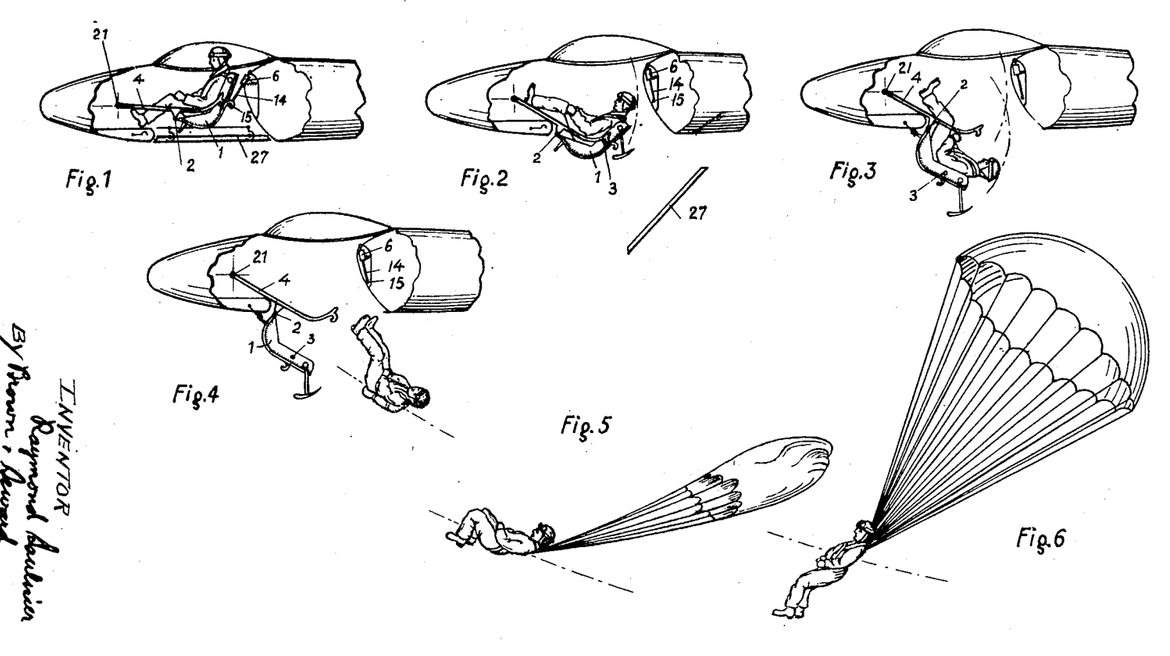
Figs. 1 to 6 are diagrammatic views showing the successive positions of a pilot ejected from a flying plane by means of a device according to the invention.

Fig. 1 shows the position of the seat in normal flight conditions. As soon as the pilot actuates a suitable hand-lever (not shown in Figures 1 to 6), the fixation of the seat on rod 14 of the jack is released at 15, so that the seat is brought, under the action of its own weight combined with the action of the weight of the pilot, into the position shown in Fig. 2, in which arms 4 are abutted against the edge of an opening provided under the seat and normally closed by a removable panel 27 which may be removed under the control of the above mentioned hand-lever before the seat reaches said opening. As soon as it has reached said position, the seat proper is released at 3 from arms 4, so that it can be further tilted about axis 2 with respect to said arms 4 into the position shown in Fig. 3. In this position, the plane being considered in its normal flying attitude, the pilot has his head turned rearwards and downwards and his back turned towards the ground and guided along the inclined plane constituted by the back of the seat, so that he glides along the seat under the action of gravity, as shown in Fig. 4, and is automatically projected off the plane, assuming, of course, that he has previously unfastened his belt.

Referring to Fig. 5, it may be seen that, as soon as the pilot opens his parachute, his fall is slowed down, so that, when the parachute spreads, as shown in Fig. 6, the pilot oscillates substantially around the upper portion of the parachute to assume his normal descending position. This arrangement is particularly interesting in the case of low altitude flight since it permits the pilot to open his parachute very quickly and since it avoids any risk for the pilot of describing a number of somersaults liable to prevent him from opening the parachute.

Figures 7, 8:
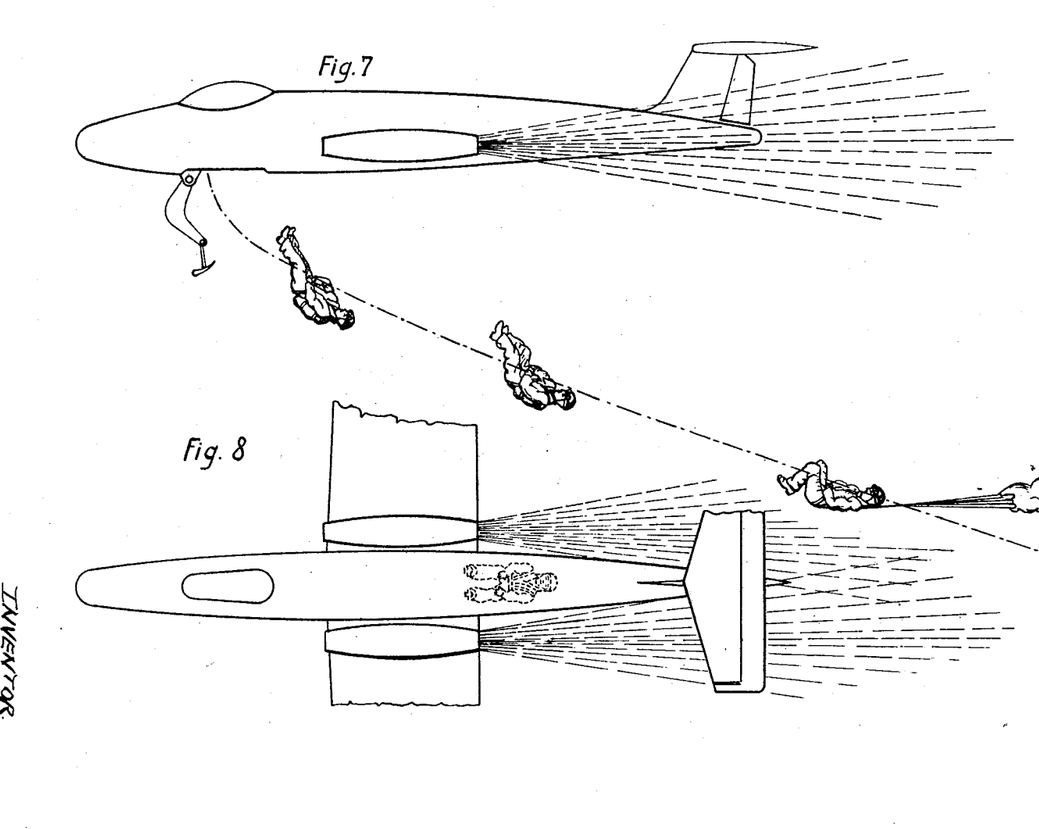

In Fig. 7, it may be seen that the path of the pilot is such that, in the case of a jet plane, he never risks being thrown into the propelling jets.

Fig. 8 shows the position of the pilot with respect to two propelling jets units mounted in the wings.

It will be easily understood, referring to the above described diagrammatic Figures 1 to 8, that the pilot is ejected from the plane in an optimum position and along an also optimum path, so that he may be parachuted in the best conditions of safety.

While the plane shown in Figs. 1 to 8 is a one-seater, it is to be understood that the invention may be also used with planes comprising a plurality of seats, each one of said seats being designed according to the invention with individual or common control means. Thus, for example, Fig. 9 shows again diagrammatically, a tandem two-seater comprising two seats designed according to the invention.

Figure 9:
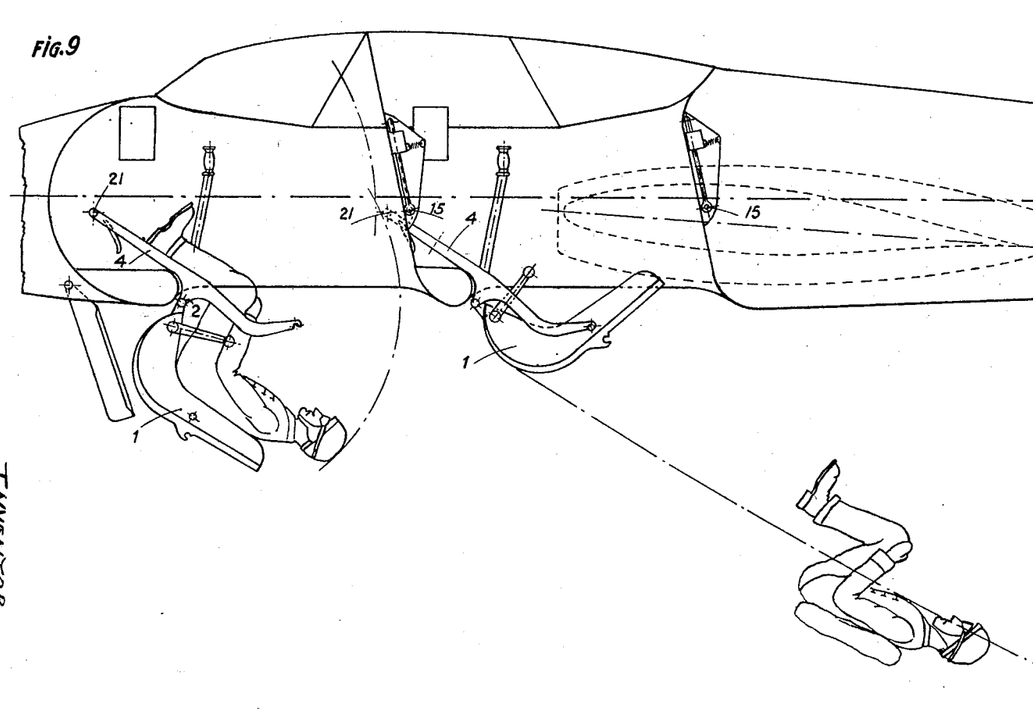
Fig. 9 shows diagrammatically the successive evacuations of the two occupants of a tandem two-seater.

In the example shown in Fig. 9, the rear pilot is shown just after evacuating its seat which is brought back by aerodynamic forces into retracted position; the front pilot is shown at the moment when he is going to be ejected from his seat.

Figure 10:
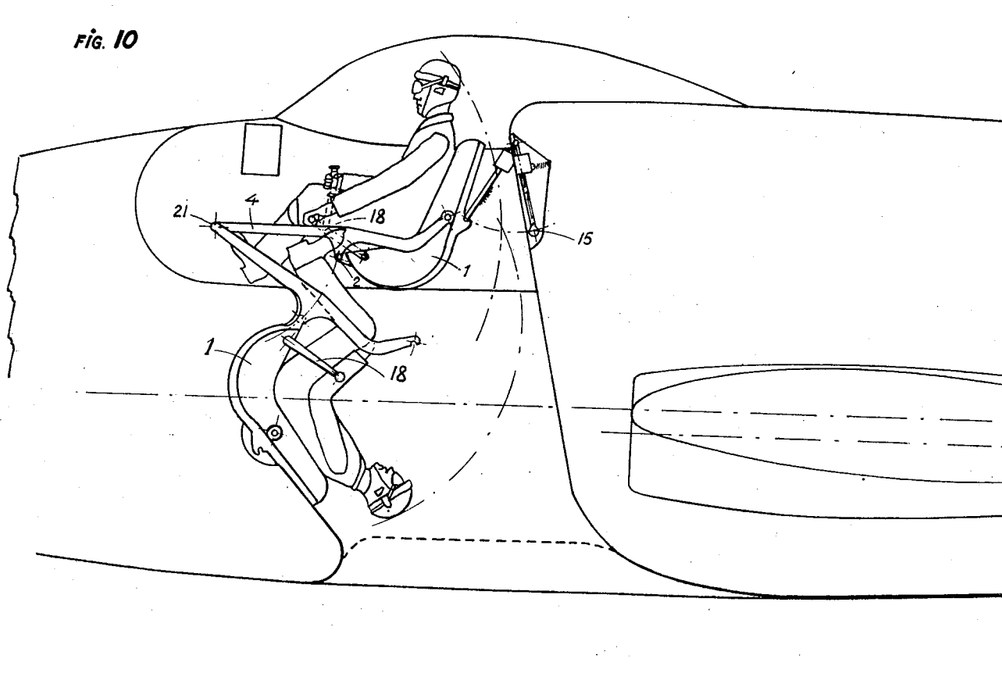
Figs. 10 and 10a are two right-angled vertical sections showing, also diagrammatically, the evacuation of one of the two occupants of a side-by-side two-seater.
Figure 10A:
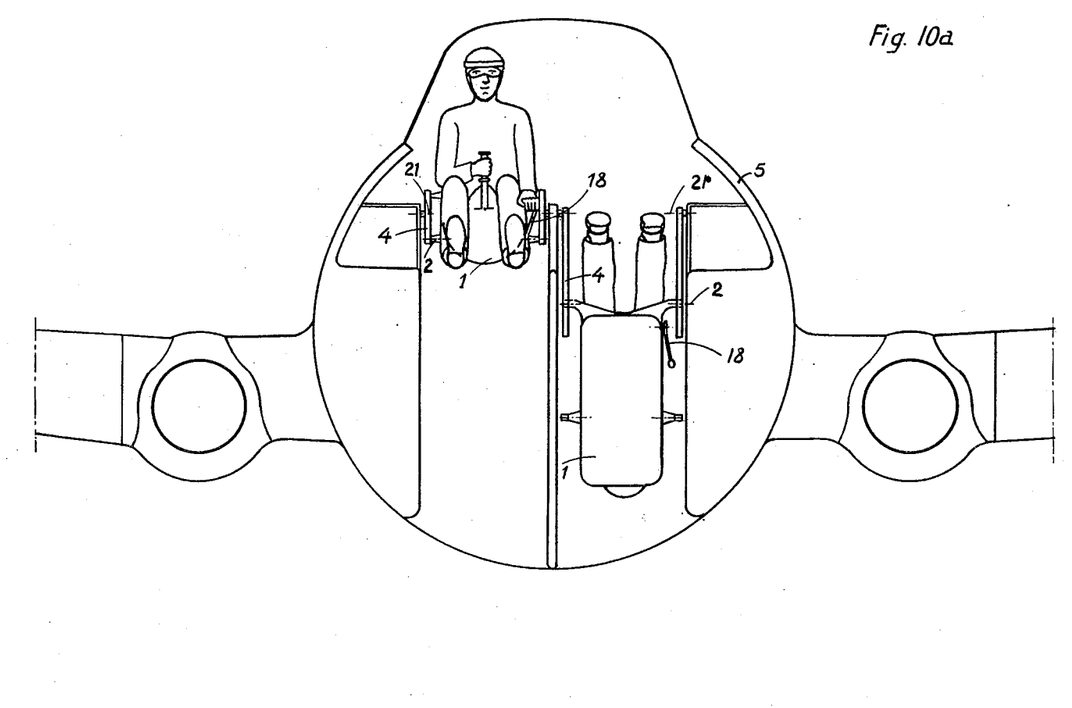

Figs. 10 and 10a show the use of seats according to the invention, in a side-by-side two-seater. In this example, one of the occupants is shown in the position in which he is going to leave the plane, under the action of his own weight, while the second occupant is still in his normal position.

It will be seen that, in the examples of Figs. 1 to 9, the plane shown is of the type in which the floor of the cockpit is located in the close vicinity of the fuselage bottom.

In these examples, the seat according to the invention is, therefore, partially exposed out of the plane in its evacuating position. On the contrary, in the example of Figs. 10 and 10a, the plane is of a type in which the fuselage has a substantial height above the cockpit floor, so that one or more (two, in the example shown) evacuation chutes should be provided in the corresponding fuselage portion.

This arrangement is particularly advantageous, since as the occupant is brought into the evacuating position, neither his seat nor any part of his body is exposed out of the plane.

Figs. 11 to 15 illustrate a specific embodiment of a seat according to the invention. In these figures, there is shown at 1 a pilot seat articulated at 2 and detachably secured at 3 on two supporting arms 4. Arms 4 are articulated about a fulcrum 21 on the fuselage. A hook 16, articulated on the seat, is detachably suspended to an electric jack 6—14 articulated on the fuselage and permitting the pilot to adjust at will the vertical position of his seat during normal flight. A pin 3 integral with the seat is locked in notches provided at the rear end of the supporting arms 4 by means of hooks 7 acting as locking means, said hooks being normally held in their locking positions by abutments 8. The unlocking is effected, as described hereunder by means of a roller 9 through connecting rods 10 and 11 and bell crank-levers 12 and 13. The rod 14 of the jack 6 carries, at its lower end, a pin 15 normally held between hook 16 which is, in turn, held stationary by a finger 40 and a notch provided in a lug 17 integral with the seat. By means of a lever 18 which constitutes the control means and which acts upon a small connecting rod 19 and a connecting rod 20, the pilot, after having lifted the transparent safety plate 53, can determine an angular displacement of finger 40 until hook 16 is released, tilts freely and releases in turn pin 15. The transparent plate 53 is held elastically in its opening and closing positions. Thus, in a period of great emergency, e. g. during a fight, the pilot can open said plate to provide for all contingencies, so that, if his evacuation becomes necessary, he has only, for opening the same, to actuate lever 18. On the contrary, in the normal flying periods, the small plate 53 may be held in its closed position, so as to avoid any risk of accidental operation.

Figure 11:
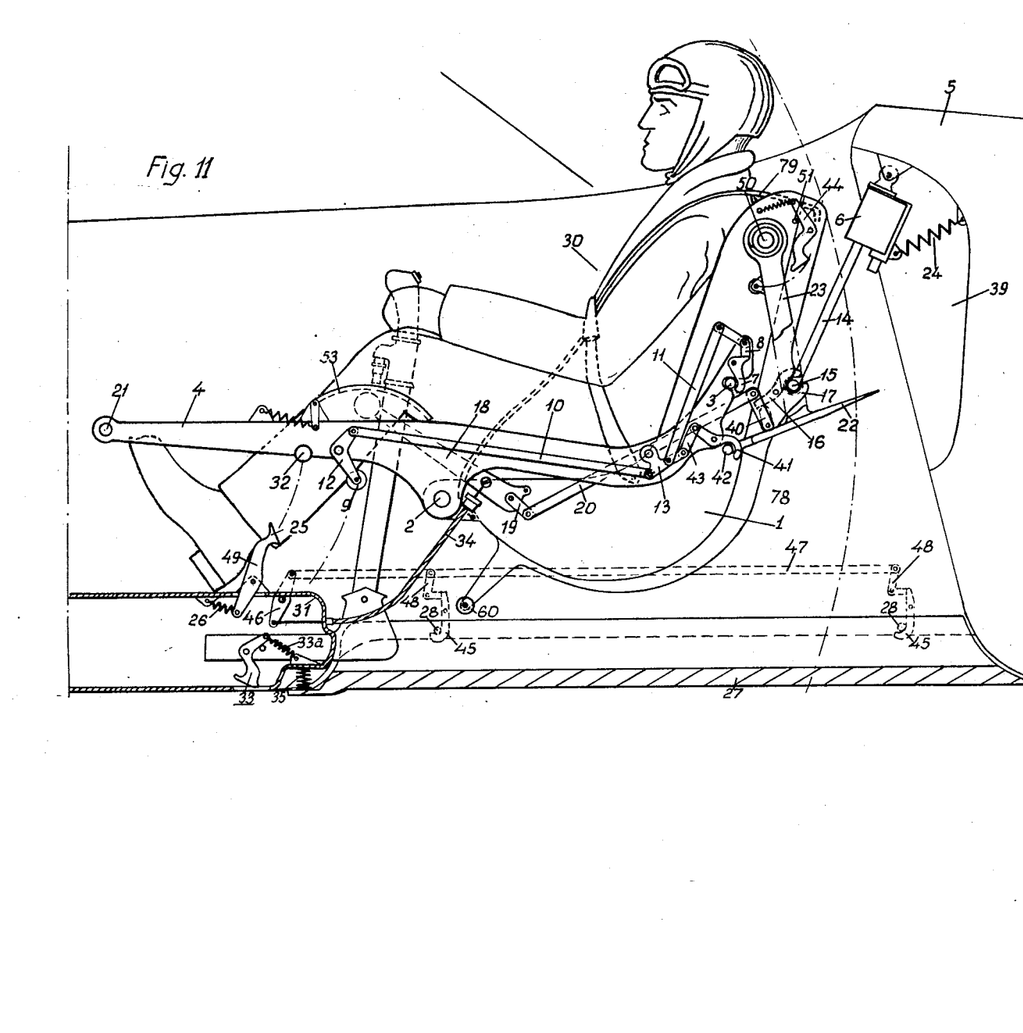
Fig. 11 is a detail view of an embodiment of a seat according to the invention, shown in its normal position.

A spring 24 urges jack 6—14 towards the fuselage, so as to retract it into a housing 39, as soon as it is released. Upon unlocking of the rear portion of the seat, the supporting arms 4 are released and oscillate around fulcrum 21 on which they are articulated at their front ends. On the back of seat 1 is articulated at 56 an airfoil 22 carried by a support 23 and normally held against the seat by hooks 41 locking pins 42. As described hereunder, the unlocking of said pins 42 is determined by roller 9 through connecting rods 10 and 43 and bell crank-levers 12 and 13. Locking levers 49 provided with a cam outline 25 and acted upon by drawback springs 26 are provided to hold the supporting arms 4 in their lowermost position at the end of the first step of the tilting motion. Similarly, locking levers 33 are provided to hold the seat in its lowermost position at the end of the second step of said tilting motion. Finally, locking levers 44 are provided to hold the airfoil in its operative position.

27 is a jettisonable panel of such a size as to provide a suitable opening to permit the seat and the pilot to project out through the bottom of the fuselage. Hooks 45 locking four pins 28 normally hold panel 27 against the fuselage. The hooks 45 are, in turn, normally locked by stop levers 48. The jettisoning of panel 27 is controlled by the pilot, again by means of the same lever 18 shifting, during a first step, levers 48, so as to release hooks 45 through a Bowden cable 34, a bell crank-lever 46 and connecting rods 47, so that said hooks 45 may release, in turn, pins 28.

Figure 12:
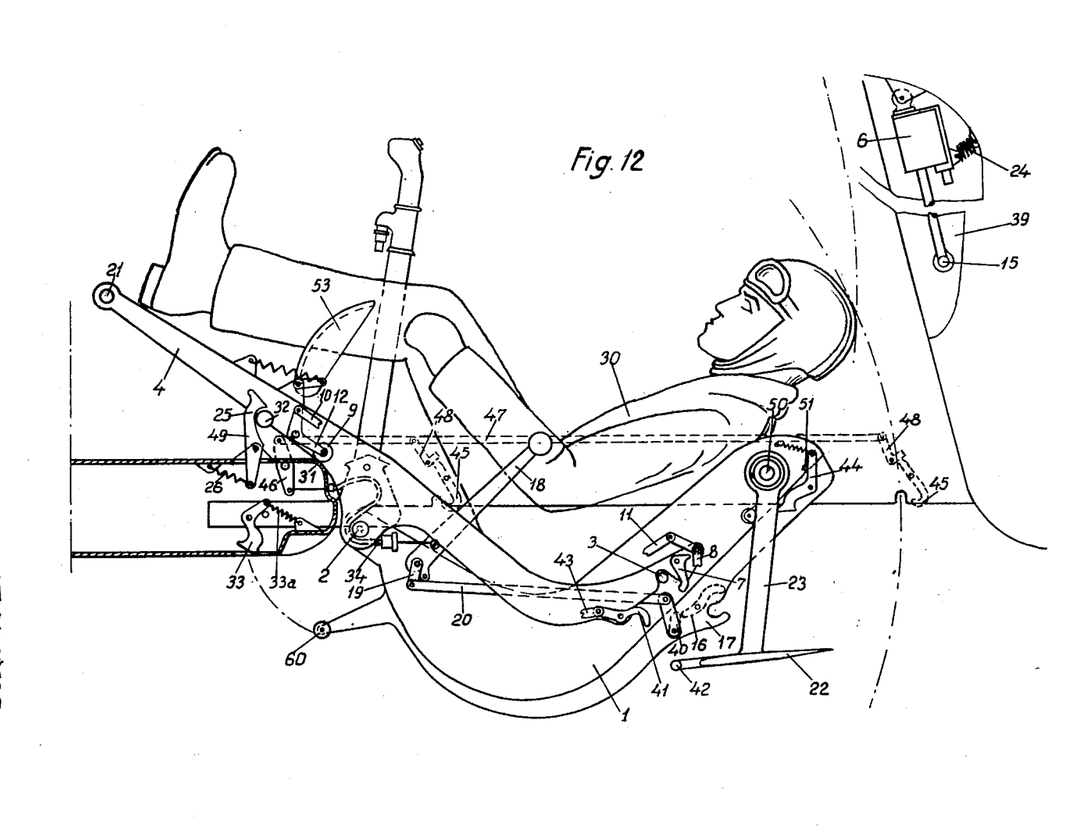
Fig. 12 is a corresponding view showing the seat in an intermediate position.
Figure 13:
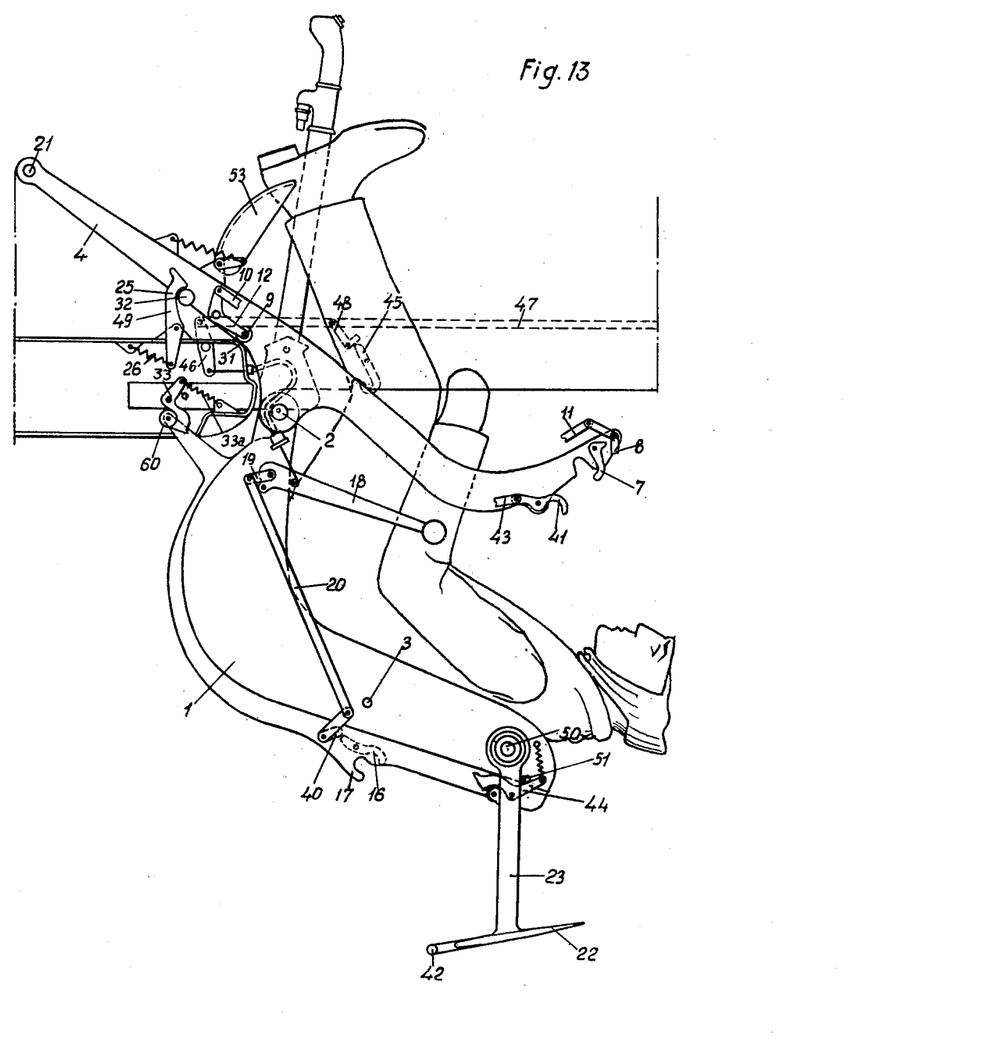
Fig. 13 is a view similar to Figs. 11 and 12 showing the final position of the seat.
Figure 14:
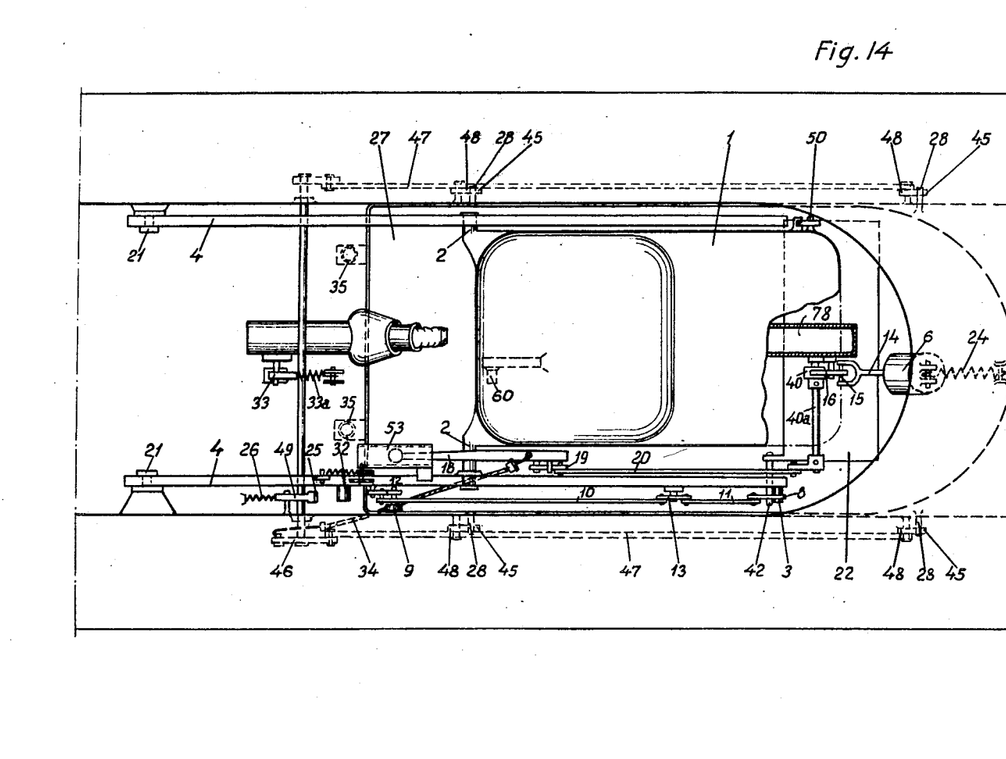
Fig. 14 is a plan view corresponding to Fig. 11.

In Figs. 12 and 13 are shown in detail the successive steps of the evacuation which are as follows:

When the pilot has decided to leave the plane, he detaches himself from the back of the seat, he lifts up the safety plate 53, if this has not been done previously, and pulls lever 18 rearwards. This results, during a first step, in releasing panel 27 in the above described manner. Springs 35 then push downwards the front portion of panel 27 which is immediately carried out by the relative wind rearwards with respect to the plane, as shown in Fig. 2. The pilot further draws lever 18 rearwards. Said lever then acts upon finger 40 which is so shifted that hook 16 is released and releases in turn pin 15. Under the action of gravity, pilot 30, seat 1 and supporting arms 4, tilt downwards during a first step by rotating around fulcrum 21, until the supporting arms 4 come into contact with the front edge 31 of the stationary frame of the bottom opening (see Fig. 12). Spring 24, after having brought jack 6 into the housing 39 holds the same therein. At the end of the above mentioned first step and at the moment when the supporting arms 4 come into contact with the frame edge 31, the rollers 9 are lifted and shift abutments 8 through bell crank-lever 12, connecting rod 10, bell crank-lever 13 and connecting rod 11, so that the hooks 7 can release pins 3. On the other hand, pins 32 carried by the supporting arms act upon the cam outlines 25 which rotate levers 49 whereupon the same, when returned into initial position under the action of spring 26, thus lock pins 32 and the supporting arms in their lowermost position. Finally, the lever 43, driven through the bell crank lever 13, rotates hook 41 around its axis, thus releasing the pins 42. Under the action of torque springs acting upon the axle 50 of the supporting arms 33, the aileron 22 then assumes the position shown in Fig. 13 in which it is held by a lock 44 and an abutment 51. The pilot together with his seat then further tilts downwards during a second step, by rotating about axis 2 until assuming the position shown in Fig. 13 in which the seat is held by the lock 33. The pilot, under the action of his own weight, as well as that of the relative wind, then rapidly falls gliding along his seat to be carried away downwards and rearwards with respect to the plane (assuming the same is in normal flight attitude), so that he moves off immediately thanks to the acceleration built up during the two above described steps of the tilting motion.

It will be understood that, as soon as the pilot on his seat projects out of the bottom opening, the aerodynamic forces acting upon the same tend to resist the downwards tilting motion generated by gravity. To counteract these objectionable effects, various means are provided, according to the invention, to be used separately or in various combinations.

First of all, to reduce the action of the aerodynamic forces, the outer portion of the seat bottom, instead of being flat, has preferably a substantially semi-spherical shape which results in reducing considerably the resultant of the aerodynamic forces acting upon the pilot and the seat and, thence, the moment of said resultant about axis 2, said moment being opposite to that of the overall weight of the pilot and the seat about the same axis. The second device is constituted by the above described airfoil 22 which is profiled and oriented so as to offer, in the position of Fig. 13, a negative angle of attack, so that the aerodynamic force acting upon said airfoil is directed downwards and such that its moment about axis 2 be opposite to the moment of the above mentioned resultant about the same axis. The area and the angular position of the airfoil 22 are so determined that the two last mentioned moments substantially balance each other. The retardating moment due to the above mentioned resultant is thus automatically compensated, whichever may be the speed of the plane at the evacuating time, so that the moment which effectively acts upon the pilot and the seat only depends upon the weight thereof.

According to another feature of the invention, the angular displacement of the airfoil 22 about axis 50 which brings said airfoil from its resting position (Fig. 12) into its active position (Fig. 13) is conjugated with the rotation of the seat about axis 2, so that the incidence of the airfoil with respect to the wind is always such that the aerodynamic force acting upon said airfoil imparts to the seat a maximum lowering moment.

Figure 15:
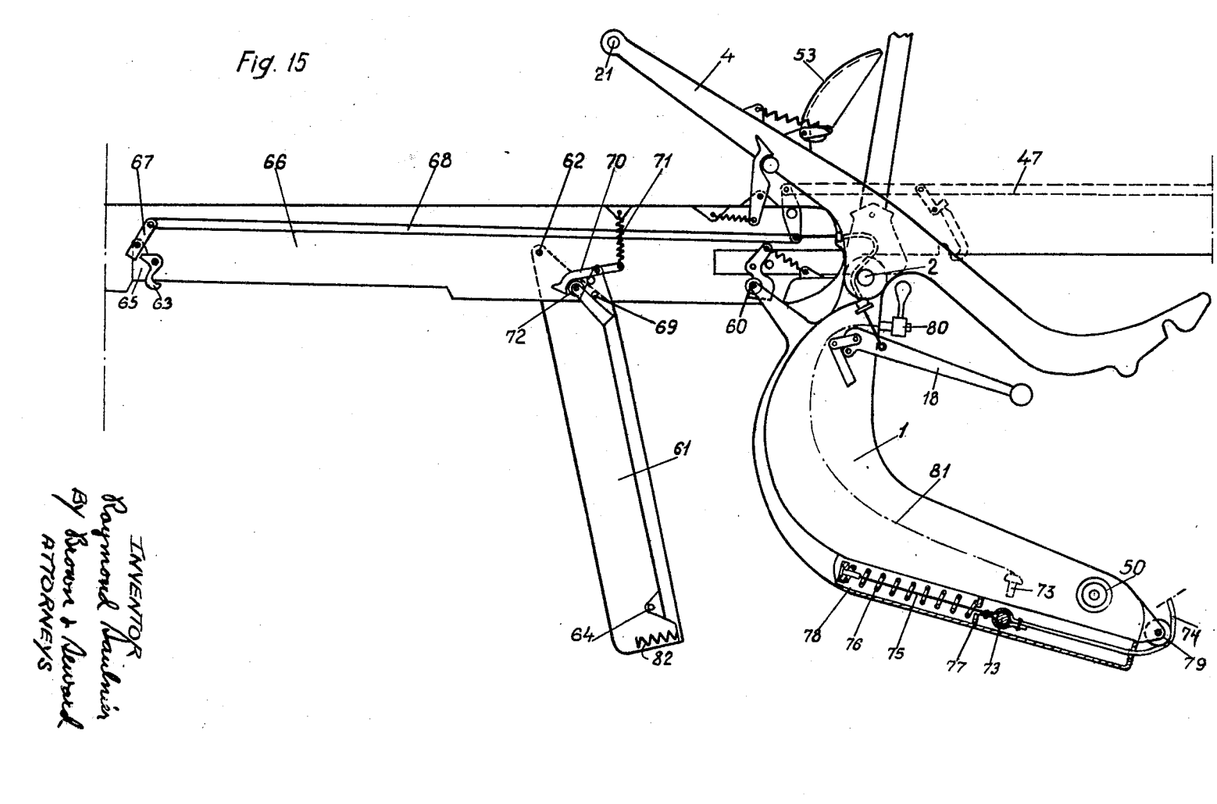
Fig. 15 is a view corresponding to Fig. 13 showing an additional safety device.

In Fig. 15, is shown an alternative embodiment in which the device is completed by a panel 61 articulated at 62 and normally retracted into a housing 66 in the inner surface of the fuselage. Said panel is normally held in said retracted position by a hook 63 engageable under a pin 64 of the free end of panel 61 and normally held hooked by a finger 67 acting upon an abutment 65 of said hook 63. The finger 67 can release the abutment 65 under the control of a linkage 68 which is linked with the connecting-rod 47 controlling the jettisoning of panel 27. When the abutment 65 is released, the hook 63 releases in turn the panel 61 which then assumes, under the combined action of its own weight, a spring 82 and the relative wind, the position shown in Fig. 15 in which it protects the seat and the pilot which, at this moment, has been brought into evacuating position, as described above.

The tilting stroke of panel 61 is limited at said position by an abutment 69 and said panel is held in said position by a lock 71 continuously urged towards its locking position by a spring 71 and the end of which, which has the shape of a hook, cooperates with a pin 72 of panel 61.

Fig. 15 also shows an alternative embodiment of the system used for fastening the pilot on his seat, this modification being necessary to provide for the evacuation of the pilot.

It is known that the pilot is usually held on his seat by a system of belts, straps and the like, this system being anchored rearwards of the pilot, on the wall of the cockpit. Such an arrangement is unpracticable with the ejecting device according to the invention.

With the seat according to the invention, it is preferable to adopt a fastening system essentially constituted by a removable gudgeon 73 securing a belt 74 fastened on the pilot shoulder straps to a metal wire 75 adapted to compress a supple spring 76, so that the pilot can bend himself easily on his seat. The compression of spring 76 is limited by an abutment 77 integral with the back of the seat. This assembly is housed in a trough 78 provided for this purpose in the rear surface of the seat back. The strap 74 runs over a roller 79 freely rotated on the seat back and permitting the pilot to move freely, as mentioned above, within the limits of the stroke of spring 76. The removal of gudgeon 73 which permits the release of strap 74 and, thus, of the pilot, is ensured, in the example shown, by means of a special control 80 capable of exerting a pull stress upon said gudgeon, through a Bowden cable 81.

In Figs. 16 to 20 is shown another embodiment in which 1 is, as previously, a seat articulated forwards about a fulcrum 21 and connected with the rear of the cockpit, in the position assumed by the seat in normal flying conditions, through a removable fixation constituted, in the example shown, by an electric jack 6—14.

Figure 16:
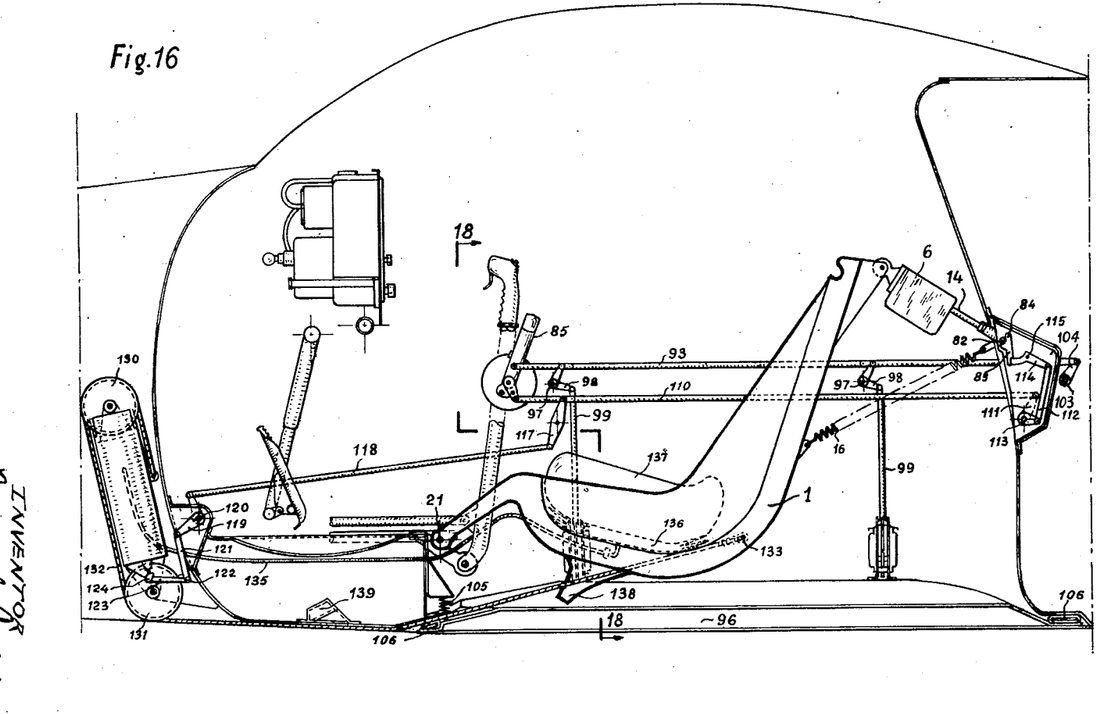
Fig. 16 is an elevational view of another embodiment of a seat according to the invention, in its normal position.
Figures 17, 18:
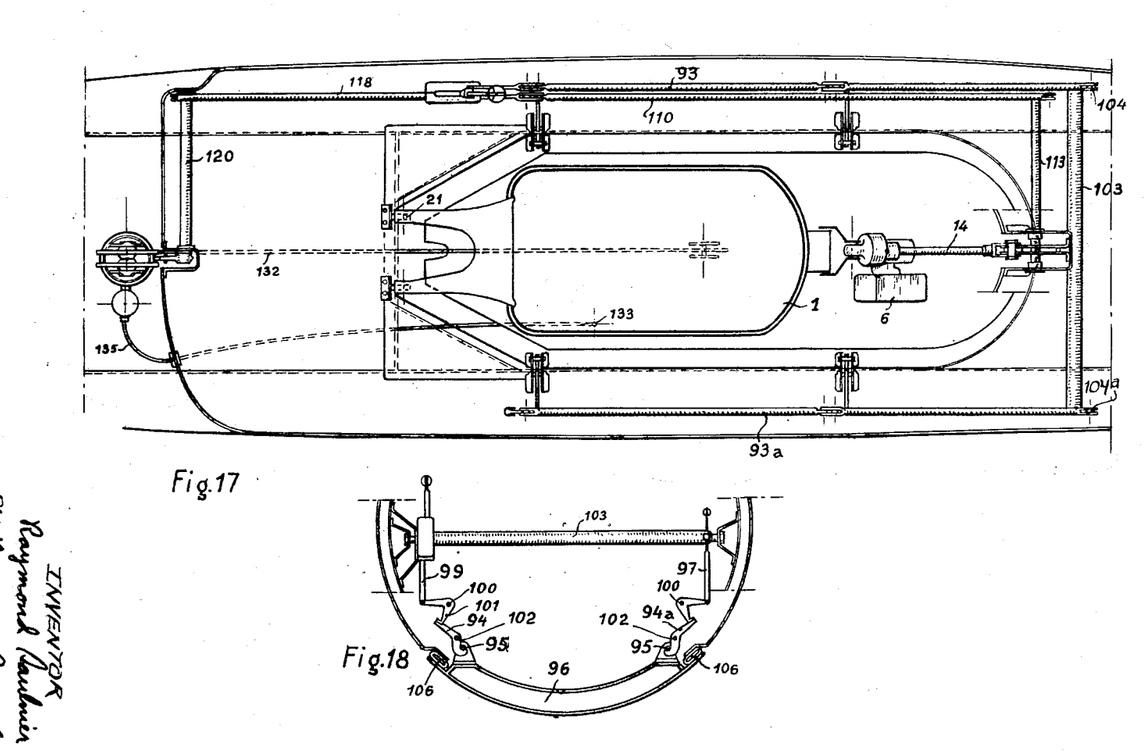
Fig. 17 is a plane view corresponding to Fig. 16.
Fig. 18 is a sectional view along line 18—18 of Fig. 16.
Figure 19:
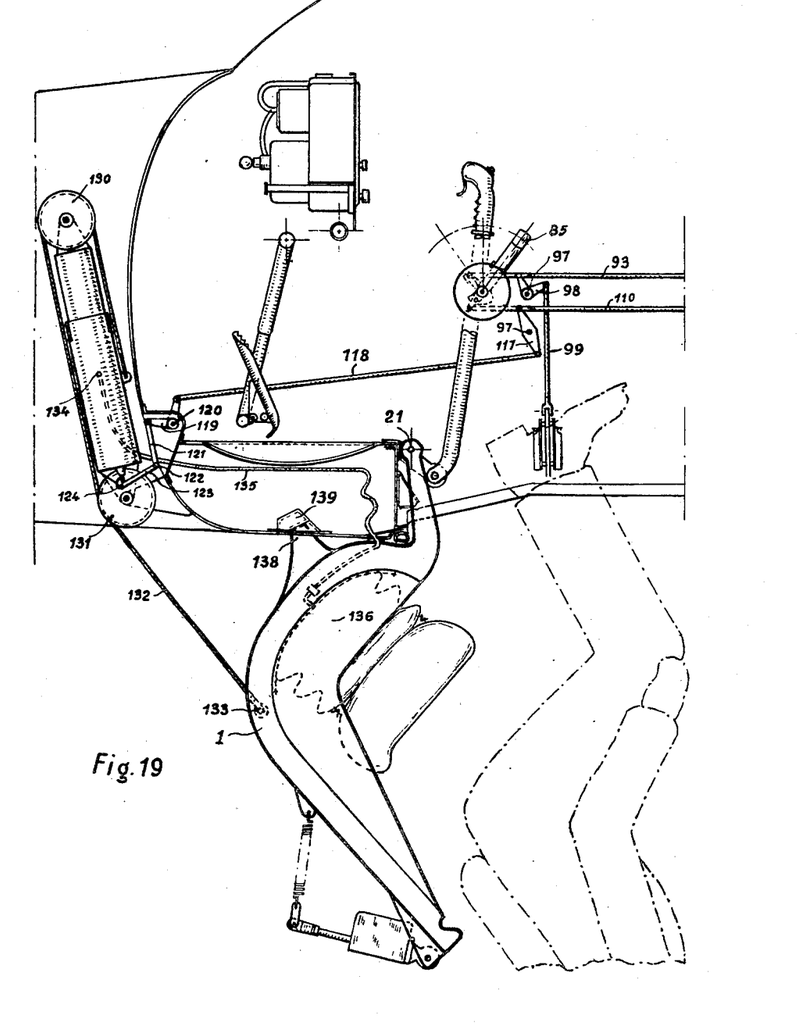
Fig. 19 is a view similar to Fig. 16, but showing the seat in the evacuating position.
Figure 20:
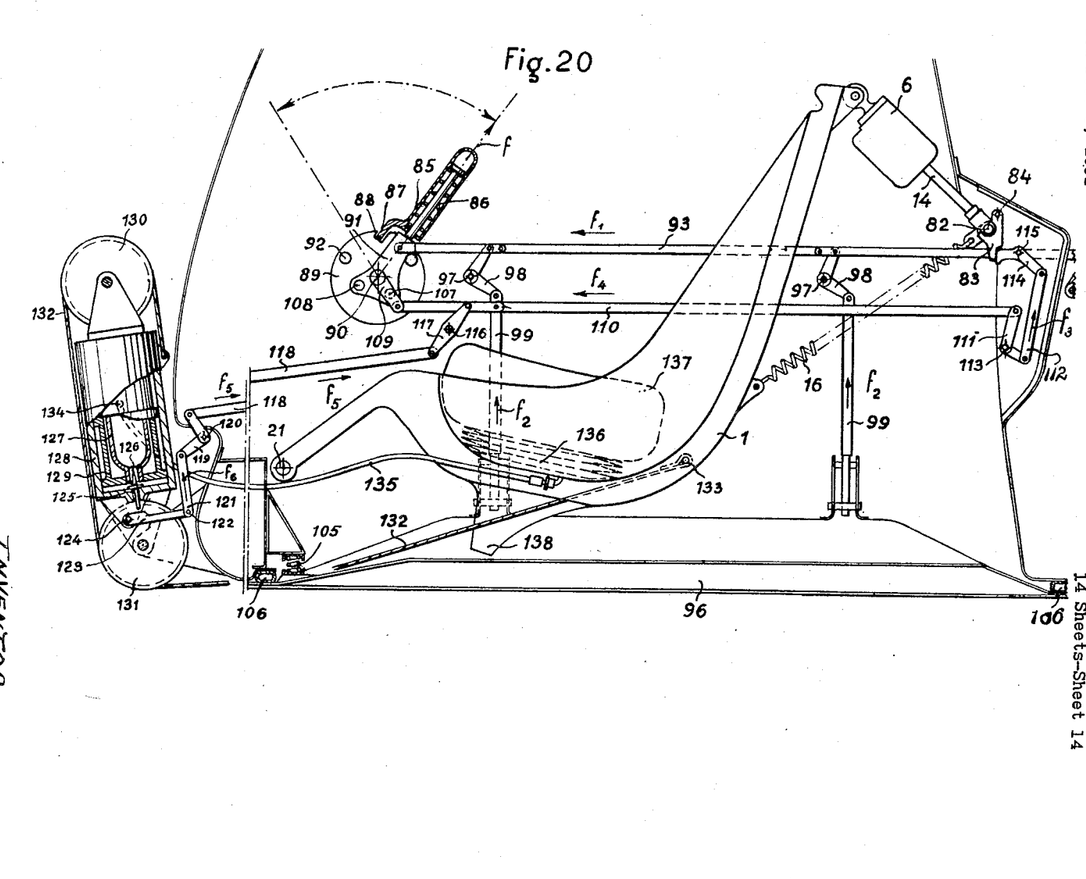
Fig. 20 is an enlarged diagrammatical view showing the details of a mechanism provided to bring the tiltable seat into its evacuating position.

In Figs. 16 and 20, the seat is shown in said normal position, while, in Fig. 19, it is shown in its evacuating position. In the normal position of the seat, the end of the rod 14 of the jack bears, through a pin 82, on a yoke 83 articulated at 84 on the cockpit wall, so that the seat is held in said normal position. To bring the seat into the evacuating position, the pilot actuates a handlever 85. He moves first the outer sheath of said lever in the direction of arrow $f$, said sheath being slidably mounted on the rod 86 of said lever and normally urged toward its lowermost position (as shown in Fig. 20). This displacement of the sheath results in releasing a stud 87 from a notch 88 provided in a disk 89, whereupon the pilot can tilt the handlever 85 about its articulation axis 90. The second step of the control consists in pivoting lever 85 forwards, i. e. anticlockwise (as shown in Fig. 20), until the section 91 of the lever comes into contact with the stationary abutment 92. This angular shift of lever 85 results in displacing, in the direction of arrow $f_1$, a link 93, so that the latter acts upon hooks 94 and 94a (see Fig. 18) normally holding through pins 95 the closing panel 96 against the bottom of the fuselage. This displacement is transmitted from link 93 to said hooks 94 in the following manner: as link 93 moves in the direction of arrow $f_1$, it rotates levers 98 about their stationary articulation axis 97, which causes a displacement in the direction of arrow $f_2$ of links 99 which rotate, in turn, levers 101 about their articulation axes 100, said levers 101 then releasing hooks 94, so that the panel 96, under the action of its own weight, rotates said hooks 94 about their articulation axes 102.

The displacement of link 93 (see Fig. 17) is transmitted to another link 93a located on the other side of the seat through a torque shaft 103 carrying connecting rods 104 and 104a articulated on links 93 and 93a, respectively. Link 93a controls hooks 94a similarly to the control of hooks 94 from link 93. Under the push exerted by springs 105 (and, if required, under the action of air pressure in pneumatic packings 106 provided for this purpose), the front portion of panel 96 withdraws from the fuselage and the relative wind then carries away panel 96 which rapidly flies off the plane.

At the end of the forward stroke of lever 85, a spring-catch 107 is engaged into an opening 108 provided at the lower portion of section 91 of lever 85, so that the same is made fast with another lever 109. The next step consists in pulling lever 85 rearwards, which determines the following results: conecting rod 110 is displaced in the direction of arrow $f_4$, so that an upward push in the direction of arrow $f_3$ is exerted, through a crank-lever 111 and a torque shaft 113, upon a connecting rod 112 articulated on another crank-lever 114. This lever is thus rotated anticlockwise (as shown in Fig. 20) about its articulation axis 115, so that it releases the lower end of the yoke 83 on which bears, through pin 82, the rod 14 of jack 6. A spring 16 then immediately releases pin 82 off said yoke 83, so that the seat is made free to rotate about its fulcrum 21.

The same displacement of the connecting-rod 110 results in rotating anti-clockwise, around its articulation axis 116, a lever 117 which determines the displacement in the direction of arrow $f_5$ of a connecting-rod 118 which rotates clockwise a crank-lever 119 about its articulation axis 120. This angular displacement determines, in turn, a displacement in the direction of arrow $f_6$ of a lever 121 articulated at 122 on a second lever 123, the other end of which is articulated on a stationary axis 124. The displacement of lever 123 exerts an upwards push (as shown in Fig. 16) on a needle 125 which then perforates a metal diaphragm 126 which normally obturates an opening provided in a compressed air container 127. Compressed air from said container is thus introduced into a chamber provided between the bottom of a cylinder 128 and the lower face of a piston 129 which is thus pushed upwards (as shown in Fig. 20).

This piston acts, in turn, upon a tackle constituted by a first pulley 130 rotatively mounted on the body of piston 129 and by a second pulley 131 carried by cylinder 128. The relative displacement between pulleys 130 and 131 results in a pulling stress exerted on a cable 132 with a multiplication which is a function of said displacement. It will be understood that the tackle may comprise any desired number of pulleys without departing from the scope of the invention.

The cable 132 is anchored at 133 on the lower portion of seat 1, so as to urge the same clockwise (as shown in Fig. 20) about its fulcrum 21. When piston 129 reaches the end of its stroke, the pressure air passes through an opening 134 provided in the side wall of the cylinder at a predetermined level and suddenly inflates through a flexible pipe 135 and, if required, through a pressure-reducing valve (not shown), a pleated pneumatic cushion 136 disposed under the usual cushion 137 of seat 1. The occupant of the seat then receives an impulse capable of detaching him from the seat, if required, and of projecting him off the plane.

At the end of its tilting stroke, seat 1 comes into contact through an abutment 138 against a corresponding abutment 139 provided on the body of the plane, said abutment 139 being preferably covered with a plastic or elastic material so as to absorb the shock resulting from the impact of abutment 138. The air pressure in container 127, the capacity of the latter, the diameter of piston 129, the number of pulleys of the tackle and so on, should be suitably chosen so as to determine, on cable 132, a sufficient pulling stress to bring the seat into its evacuating position, even if the plane is flying at a very high speed.

According to another feature of the invention, means are provided to counteract said pulling stress when the plane is flying at a lower speed. At such low speed, the resistance of air to the tilting motion of the seat is considerably reduced, so that, if particular arrangements were not provided, said tilting motion would be effected too quickly, which would offer certain drawbacks. In particular, the occupant would be prematurely detached from his seat, so that he would not be guided along his evacuation path at the beginning of the operation.

Furthermore, the seat would produce a violent shock at the end of the tilting motion, said shock risking to break the fixation around fulcrum 21.

According to the invention, the stress determining the tilting motion of the seat is limited to a suitable value by shock absorbing means such as a dash-pot. Furthermore, means for regulating the rate of flow may be interposed between the container and cylinder.

It is pointed out that the leverage of the stress exerted by cable 132 about the fulcrum 21 of the seat varies as a function of the area of that surface of the seat which is exposed to the relative wind and, thence, as a function of the aerodynamic force resisting the tilting motion. This feature permits obtaining more easily a substantially uniform tilting speed.

While the invention has been described with particular reference to a preferred embodiment, it is not intended to limit the scope of the invention to the embodiment illustrated, nor otherwise than by the terms of the subjoined claims.

What is claimed is:

1. A device for evacuating an occupant seated in a cockpit of an aircraft comprising, in combination, a backed seat downwardly tiltable around a transverse axis located in front of said seat, releasable means to hold said seat in normal sitting position, a normally covered opening in the bottom of said cockpit beneath said seat, means to uncover said opening, means to release said seat to allow the same to tilt into said opening and abutment means to stop said seat in said opening when its back has reached a predetermined position inclined downwards and rearwards with respect to said bottom, whereby said occupant is caused to leave said seat by a movement of translation in a direction depending upon said back predetermined position.

2. An evacuating device according to claim 1 to be used in an aircraft of the type in which the bottom of the cockpit substantially coincides with the lowermost surface of the fuselage in which said opening is normally covered by a tiltable panel articulated on the front edge of said opening, means being provided to lock said panel in a rearwardly and downwardly inclined position in front of the tilted seat, whereby said panel acts as a wind deflector to protect the occupant of the seat before his evacuation.

3. An evacuating device according to claim 2 in which said seat is further provided with an articulated airfoil having such a profile and adapted to assume such a position, when the seat projects through said opening in the evacuating position, that the resultant of aerodynamic forces acting upon said airfoil tends to hold the seat in said evacuating position.

4. An evacuating device according to claim 1 to be used in an aircraft of the type in which said cockpit bottom is located at a considerable height above the lowermost surface of the fuselage, in which said opening is constituted by a passage directed downwardly and rearwardly from said cockpit bottom to said fuselage lowermost surface, said passage being normally covered at both ends.

5. In a multiplace aircraft, a device for evacuating a plurality of occupants seated in at least one cockpit of said aircraft, said device comprising, in combination, a plurality of backed seats, each backwardly tiltable about a transverse axis located in front of each said seat, releasable means to hold said seats in normal sitting position, a normally covered opening in the bottom of said cockpit beneath each seat, means to uncover said openings, means to release each seat to allow the same to tilt backwardly about said axis into the relevant opening, abutment means to stop said seat in said opening when its back has reached a predetermined position inclined downwards and rearwards with respect to said bottom and at least one single control station adapted to actuate the opening uncovering means and releasing means of each seat in a predetermined order, whereby said occupants are caused to leave their seats in a predetermined sequence by movements of translation in directions determined by the ultimate position of the back of said seats.

6. A device according to claim 5 in which a number of said openings are grouped in one single cut-off portion located under a plurality of said seats.

7. In an aircraft fuselage provided with a normally covered opening through its floor for evacuating an occupant of the fuselage, a seat for said occupant positioned above said opening and having a base portion mounted to pivot backwardly about a transverse axis located in front of said seat, releasable suspension means interposed between said seat and said fuselage to hold the seat in normal sitting position, control means adapted to uncover said opening and to release said seat from said suspension to allow the seat to tilt backwardly into said opening, and abutment means to stop said tilting motion of the seat when the same has reached a predetermined position.

8. In an aircraft fuselage provided with an opening through its floor for evacuating an occupant of the fuselage, a releasable closure member for said opening, a seat positioned above said opening and mounted to pivot backwardly about a transverse axis located in front of said seat, releasable and adjustable suspension means to hold said seat in normal sitting position, and hand operated control mechanisms including a single actuating lever and adapted to successively release said closure member and said seat upon successive actuations of said lever.

9. In an aircraft fuselage provided with an opening through its floor for evacuating an occupant of the fuselage, a releasable closure member for said opening, a seat positioned above said opening and mounted to pivot backwardly about a transverse axis located in front of said seat, locking means to lock said seat in normal sitting position, a hand operated mechanism to release said closure member and said seat from their respective locking means, and fluid pressure responsive means controlled by said mechanism adapted to swing said seat from said normal sitting position backwardly about said transverse axis as soon as said closure member and said seat are unlocked.

10. In an aircraft fuselage provided with an opening through its floor for evacuating an occupant of the fuselage, a removable closure member for said opening, a seat above said opening mounted to pivot backwardly about a transverse axis in front of said seat, locking means to lock said closure member in closing position and said seat in normal sitting position, a hand operated mechanism to release said closure member and said seat from said locking means, a pneumatic cushion secured on said seat, a pressure fluid source, and fluid pressure responsive means controlled by said mechanism adapted to swing said seat from said normal sitting position backwardly about said transverse axis and to feed said cushion with pressure fluid from said source as soon as said closure member and said seat are released.

11. In an aircraft fuselage provided with an opening through its floor for evacuating an occupant of the fuselage, a seat for said occupant located above said opening and having a substantially horizontal base portion and an upstanding back rest, supporting means for said seat including at least one arm extending from the front edge of said base portion of the seat and having its outer end pivoted to the fuselage about a transverse axis located near the front edge of the frame of said opening, and releasable means interposed between said back rest of the seat and the fuselage to hold said seat in normal sitting position, a removable closure member for said opening, control means to remove said closure member and release said back rest from the fuselage to allow said seat to swing backwardly through said opening about said transverse axis, and stop means to arrest said backward movement of the seat at a point in which said back rest is downwardly and rearwardly inclined with respect to said floor, whereby said occupant is caused to leave said seat by a movement of translation in a direction determined by the ultimate downward inclination of said back rest.

12. In an aircraft fuselage provided with an opening through its floor for evacuating an occupant of the fuselage, a seat for said occupant positioned above said opening and having a substantially horizontal base portion and an upstanding back rest, supporting means for said seat including at least one arm extending substantially parallel to the fore-and-aft direction of the aircraft and having one end pivoted to the fuselage about a transverse axis located in front of said seat, a hinge connection between the front edge of said base portion of the seat and an intermediate point of said arm, the distance between said intermediate point and said axis being substantially the same as that between said axis and the front edge of the frame of said opening, and releasable means interposed between said back rest of the seat and said fuselage to hold said seat in normal sitting position, a removable closure member for said opening, control means to remove said closure member and release said back rest from said fuselage to allow said arm and said seat to swing in unison downwardly about said transverse axis, means to release said back rest from said arm as soon as said hinge connection has been moved near said front edge of the frame of the opening to allow said seat to swing backwardly through said opening about said hinge connection, and means to arrest said backward movement of the seat at a point in which said back rest is downwardly and rearwardly inclined with respect to said floor, whereby said occupant will be caused to leave said seat by a movement of translation in a direction determined by the ultimate downward inclination of said back rest.

RAYMOND SAULNIER.

References Cited in the file of this patent

UNITED STATES PATENTS

| Number | Name | Date |
|---|---|---|
| 1,899,104 | Ocker | Feb. 28, 1933 |
| 2,476,770 | Robert | July 19, 1949 |

FOREIGN PATENTS

| Number | Country | Date |
|---|---|---|
| 979,578 | France | Dec. 13, 1950 |